March 25, 1941.　　　J. R. JONES　　　2,236,214
METHOD OF UNITING RUBBER SHEETS
Filed June 28, 1938　　　2 Sheets-Sheet 1
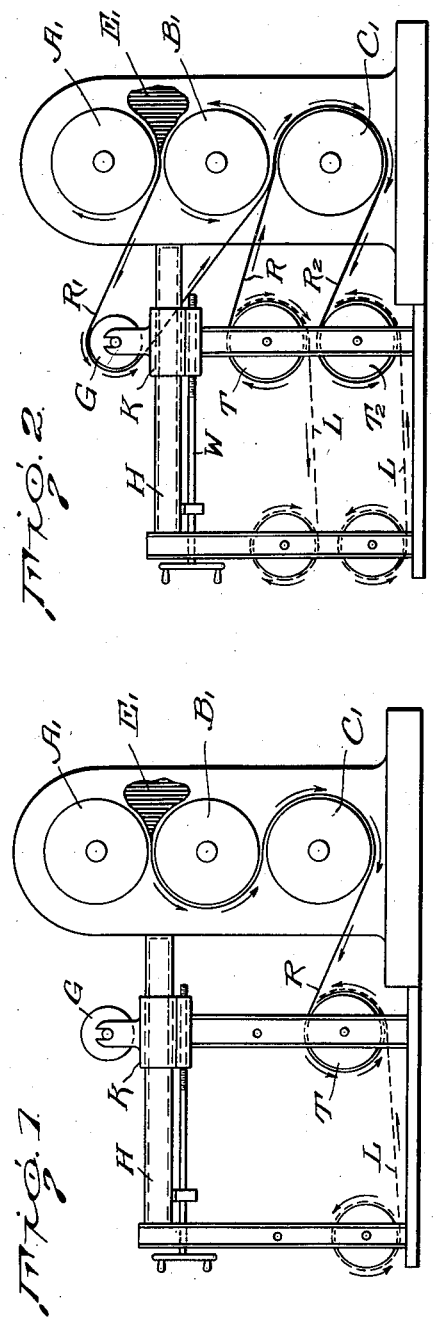
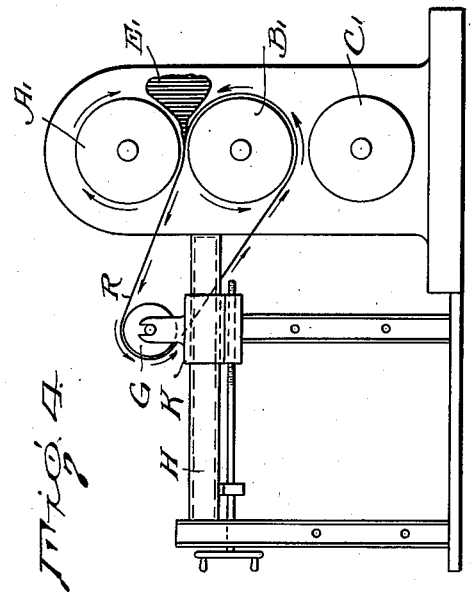
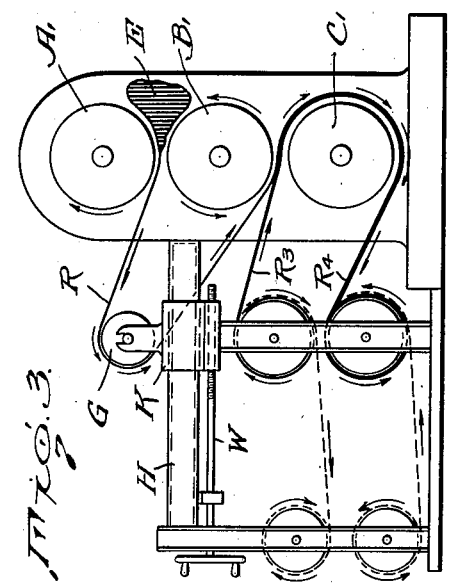
Inventor
James Roy Jones,
By George A. Degnan
Attorney March 25, 1941.   J. R. JONES   2,236,214
METHOD OF UNITING RUBBER SHEETS
Filed June 28, 1938   2 Sheets-Sheet 2
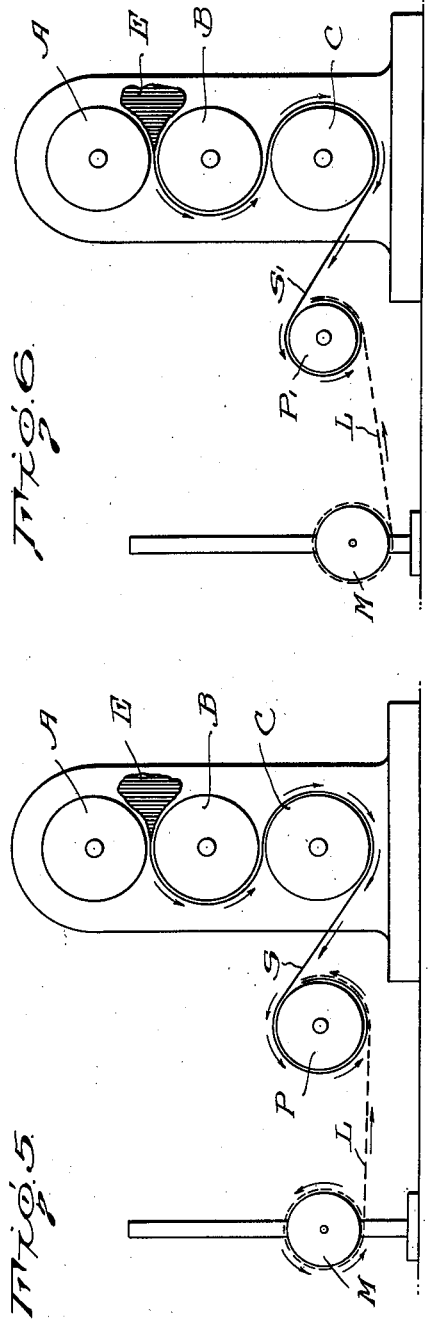
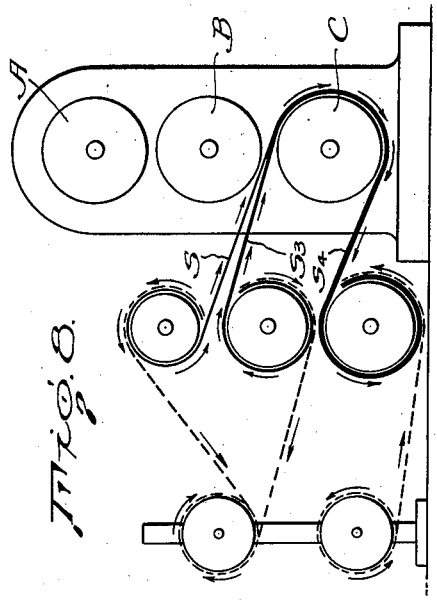
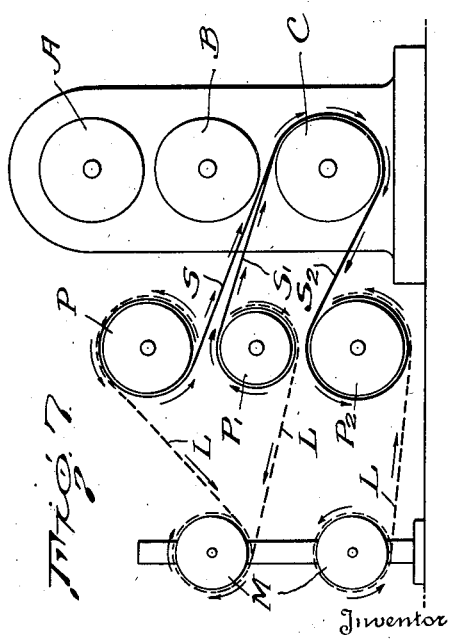
Inventor
James Roy Jones,
By George A. Degnan
Attorney Patented Mar. 25, 1941

2,236,214

UNITED STATES PATENT OFFICE 2,236,214

METHOD OF UNITING RUBBER SHEETS

James Roy Jones, Lima, Ohio, assignor of one-fifth to C. M. Cable, Lima, Ohio

Application June 28, 1938, Serial No. 216,353

2 Claims. (Cl. 18—59)

The present invention relates to a method of calendering multi-ply rubber sheets, and more particularly to a novel combination of calendering machine and means for controlling the tension on the sheet as it is calendered.

At the present time, one of the principal methods of calendering multi-ply sheets for use in mechanical goods is first to calender a relatively long sheet of rubber from bulk stock, after which it is cut into short lengths and the several lengths thus obtained united successively to each other until the desired thickness is obtained. This method not only requires that the sheets be passed through the calender a number of times, but frequently results in the presence of air bubbles in the calendered sheets, necessitating the use of pricker bars and, at times, the sheets have to be rerun with the bulk stock.

It is an object of the present invention to decrease the length of rubber sheet passed through the calender and thus eliminate some of the operations and time required to produce a multi-ply sheet.

It is another object of the invention to provide means for imposing a tension on the sheet as it is run through the calender to eliminate back flow of rubber incident to the squeezing thereof by the calender rolls and thereby prevent the formation of bubbles in the sheet.

Other objects will be apparent from the following description of the invention taken in connection with the accompanying drawings, in which Figs. 1 to 4 are diagrammatic illustrations of the apparatus and the several operations employed in carrying out the present method; and Figs. 5 to 8 illustrate diagrammatically one form of apparatus and method followed in building up multi-ply sheets as practiced at present.

Reference will first be made to the calender and method illustrated in Figs. 5 to 8, referred to hereinafter as the old method. In Fig. 5 it will be seen that bulk stock E is fed to rolls A and B, being formed into a sheet S by these rolls, this sheet subsequently passing between rolls B and C for further calendering and then around the latter roll to roller P on which it is wound together with the conventional liner L taken from roller M. The length of this sheet may, for example, be forty-five yards. There is then formed a second sheet $S_1$ as shown in Fig. 6, the length of this sheet, however, being only one-third that of sheet S, that is, fifteen yards. Sheet $S_1$ is wound on roller $P_1$ with the usual liner.

The next step in the old process is the uniting of sheet $S_1$ with a portion of sheet S. This is shown in Fig. 7, wherein rollers P and $P_1$ are disposed above roller $P_2$, sheets S and $S_1$ being unwound simultaneously and passed between rolls B and C, then wound on roller $P_2$. After the fifteen yard length $S_1$ is united to a corresponding length or portion of sheet S, the united sheet is cut, resulting in a fifteen yard two ply sheet indicated at $S_2$. In the same manner, sheet $S_2$ is then united to another fifteen yards of sheet S to form a fifteen yard three ply sheet $S_3$. The last step is shown in Fig. 8, wherein sheet $S_3$ is shown as being united to the remainder of sheet S to form a fifteen yard length of four ply rubber sheet. While in the example described the ultimate thickness of the sheet will be four ply and definite lengths of sheets are referred to, it is to be understood that a fewer or greater number of plies may be united and that the lengths given are merely illustrative of the method.

From the foregoing it will be seen that in each uniting operation fifteen yards are taken from sheet S and that the total run is one hundred and five yards, that is, one forty-five yard run in the first pass and four fifteen yard runs in the following four passes.

In the foregoing method, the rubber frequently buckles while being plied and is filled with air pockets. To remove the air pockets the operator punctures them with a pricker bar. In some cases the buckling and formation of air pockets so damages the sheets that it is necessary to run them through the calender a second time along with the bulk stock.

The disadvantages referred to are eliminated in the present invention, a preferred embodiment of which is shown in Figs. 1 to 4. As shown in these views, the calender is of the conventional type, employing three rolls $A_1$, $B_1$, and $C_1$. In Fig. 1, a rubber sheet R for instance fifteen yards in length, is calendered in the usual manner from bulk stock $E_1$, being wound on roller T with the usual liner L. As shown in Fig. 2, a second sheet $R_1$ is calendered and united to sheet R to form a two ply sheet $R_2$. It is to be noted, however, that sheet $R_1$, after leaving the space between rolls $A_1$ and $B_1$, is passed over roller G forming part of the tensioning device used in the apparatus. This tensioning device is shown as a carriage K slidably mounted on a guide-frame H and adapted to be moved toward and away from the calender rolls by an adjusting screw W. Roller G is journaled in carriage K. Thus the position of roller G with respect to the calender rolls may be varied at will to place the sheet passing thereover at such tension as will prevent buckling and the formation of air bubbles. The operator is able readily to observe whether the tension on the sheet is too little or too great and adjust the tensioning device accordingly.

After two sheets have been united to form a two ply sheet $R_2$, the latter sheet is wound on roller $T_2$. A third sheet is then formed by the upper two rolls and united to sheet $R_2$ to form a three ply sheet $R_3$. In a similar manner a fourth sheet is united to sheet $R_3$ to form a four ply sheet $R_4$, the latter operation being shown in Fig. 3. In each of the uniting steps, the sheet formed by rolls $A_1$, $B_1$, is passed over the tensioning roll. Also, suitable brake means (not shown) are employed to tension the rollers $T$, $T_2$, to control the unwinding of the sheets while they are being united.

It will be obvious from the foregoing that only four fifteen yard passes are required to unite four sheets. As compared with the old method previously described, it will be seen that the saving in length run through the calender is over 40% and, of course, a corresponding time and labor saving is effected. It is also apparent that, with the elimination of buckling and air bubbles, remilling runs are avoided and a further saving in time and labor obtained.

It is not always necessary to stop the calender rolls between the uniting operations in the method just described. On the other hand, unless the rubber compound be tough or hard, it is possible to continue the sheet back around roll $B_1$ as shown in Fig. 4 without stopping the calender. This is not possible with the apparatus employed in the old method described herein.

While the tensioning device has been described as one employing a screw for the purpose of adjusting the same, it is intended that other mechanical equivalents be utilized to effect the necessary adjustments if desired. Hence, cams, fluid pressure devices, and other suitable means may be substituted for the screw adjustment illustrated.

The apparatus and method described are particularly adapted to the calendering of sheets for use in mechanical rubber goods, that is, where the compound is made up of shoddy and cheaper grades of rubber.

It is evident that the present invention, as compared with the old method, requires fewer operations, less liner fabric, a decrease in faulty or defective rubber sheets, and a definite saving in time and labor. The tensioning device is easily and quickly applied to any standard calender machines and is readily adjusted by the operator. Furthermore, in this method, the bulk stock is always in position and ready for subsequent operations.

While a preferred form of apparatus and sequence of steps have been described, and certain lengths and number of plies referred to herein, it is not intended that the invention be limited to the exact details illustrated.

What is claimed is:

1. The method of uniting rubber sheets to form a multi-ply sheet which consists in providing a plurality of opposed calender rolls, passing rubber between certain of said rolls to form a single sheet of rubber, guiding the formed sheet to others of said rolls, passing said sheet and a second rubber sheet between said other rolls to unite said sheets, continuing the forming of the single sheet between said certain rolls, and passing the united sheets together with the single sheet between said other rolls.

2. The method of uniting rubber sheets to form a multi-ply sheet which consists in providing a plurality of opposed calender rolls, passing rubber between certain of said rolls to form a single sheet of rubber, guiding the formed sheet to others of said rolls, passing said sheet and a second rubber sheet between said other rolls to unite said sheets, continuing the forming of the single sheet between said certain rolls, passing the united sheets together with the single sheet between said other rolls, and tensioning the single sheet in its passage from said certain rolls to said other rolls.

JAMES ROY JONES.